United States Patent [19]
Garel

[11] 4,417,743
[45] Nov. 29, 1983

[54] SELF ORIENTABLE VEHICLE PROPELLED BY A SYSTEM OF PEDALS ACTUATING A CHAIN

[76] Inventor: Yves Garel, Champ-la-Lioure, 07210 Chomerac, France

[21] Appl. No.: 275,120

[22] Filed: Jun. 18, 1981

[30] Foreign Application Priority Data

Jun. 25, 1980 [FR] France .............................. 80 14581
Aug. 8, 1980 [FR] France .............................. 80 18078

[51] Int. Cl.³ .............................................. B62K 5/04
[52] U.S. Cl. .................................... 280/266; 280/282
[58] Field of Search ............... 280/235, 266, 282, 293, 280/87.04 A

[56] References Cited

U.S. PATENT DOCUMENTS 3,392,991 7/1968 Ryan et al. .......................... 280/282
3,751,062 8/1973 White ............................ 280/87.04 A
4,132,435 1/1979 Wilson ................................ 280/282

Primary Examiner—John A. Pekar
Assistant Examiner—D. Lynn Fugate
Attorney, Agent, or Firm—Eric P. Schellin

[57] ABSTRACT

A velocipede having a single driving wheel which is powered by rotating pedals that rotate a sprocket that is connected to the driving wheels by a chain. A roller assembly comprises small diameter rollers having a roller axis that is disposed lower than and in front of the pedal axis. The rollers are connected to the velocipede frame by a bearing member so that the rollers can be articulated allowing the rider to lean on the velocipede thereby controlling the direction of movement.

8 Claims, 8 Drawing Figures

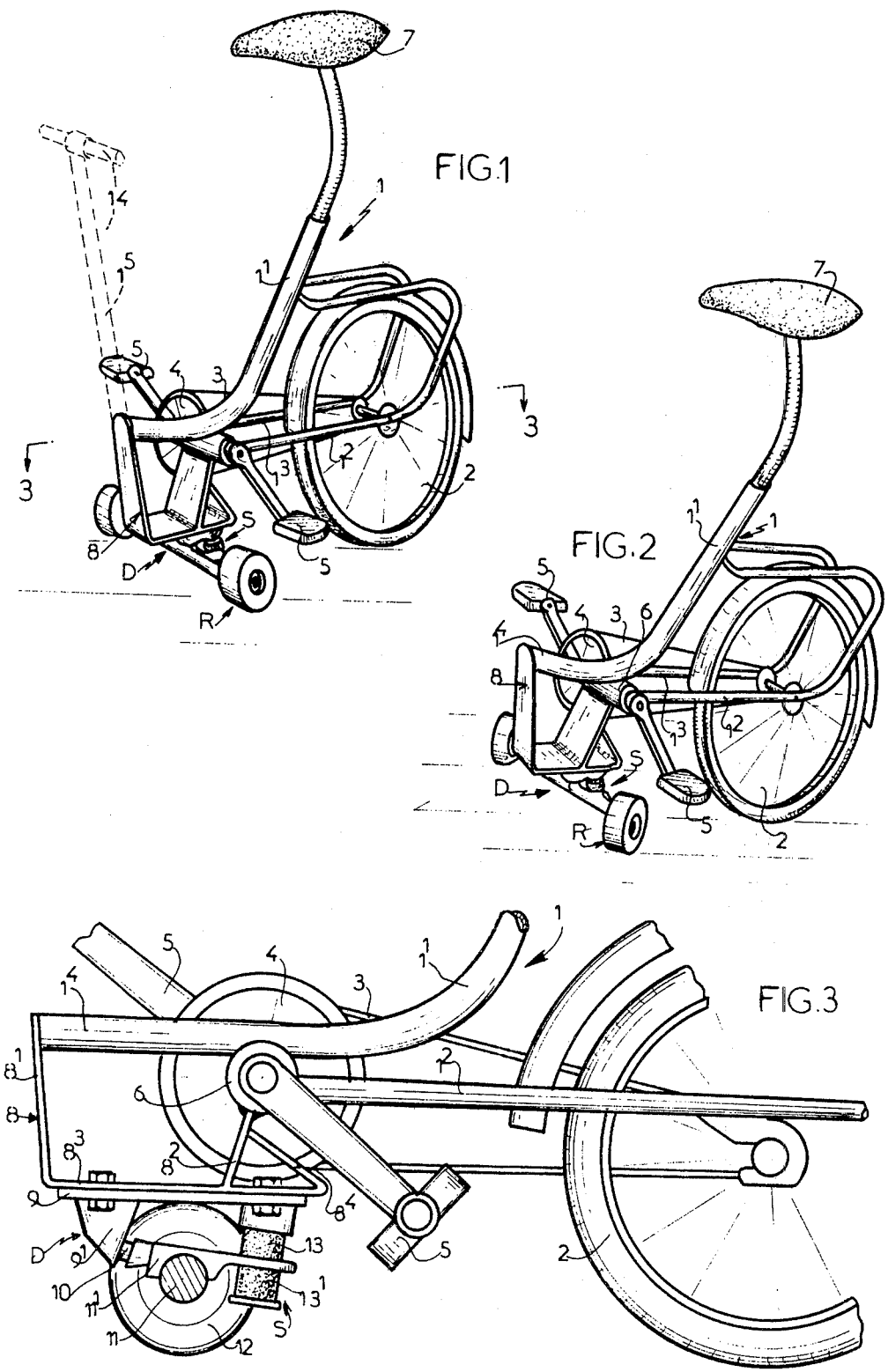

SELF ORIENTABLE VEHICLE PROPELLED BY A SYSTEM OF PEDALS ACTUATING A CHAIN

BACKGROUND OF THE INVENTION

The invention has for its object a self-orientable vehicle propelled by a system of pedals actuating more particularly a chain.

The object of the invention belongs more particularly to the technical fields of vehicles such as bicycles, sports, games and hobbies.

SUMMARY OF THE INVENTION

In accordance with the invention, there has been provided a particularly simple and inexpensive vehicle, permitting the user to move while giving him a new feeling in driving, which is imparted by the structure proper of the vehicle. For this purpose, and preferably, the vehicle in accordance with the invention is derived in the main point from a bicycle and more generally from any vehicle propelled by a system of pedals actuating a chain or not.

A first characteristic of the invention resides in the fact that the vehicle is essentially comprised of a framework which receives a rear wheel driven more particularly by a sprocket wheel mounted within a sprocket wheel housing integral with the framework, the latter being designed for receiving a seat, while being integral, more particularly adjacent to the crank wheel housing, with a device having bearing means and designed for holding in balance the vehicle in the inactive position thereof, in combination with the driving wheel, and moreover for providing the self-orientation of said vehicle by suitable and simple crosswise slanting motions of the body of the user.

In accordance with an alternative form of embodiment, the self-orientation device of the vehicle is arranged and provided with various means so that this device will be mounted adjustably angularly and endwise relative to the slanting of the framework to permit the steering radius of the vehicle to be varied.

These and further characteristics will be apparent from the following description.

BRIEF DESCRIPTION OF THE DRAWINGS

To make the object of the invention better understood, without however limiting it thereby, the invention will be illustrated now with reference to the attached drawings, in which:

FIG. 1 is a perspective view of the vehicle in accordance with the invention;

FIG. 2 is a view similar to FIG. 1, in which the self-orientation of the vehicle is shown;

FIG. 3 is on a larger scale a view in longitudinal section taken along the line 3—3 in FIG. 1;

DETAILED DESCRIPTION

Figure 4:
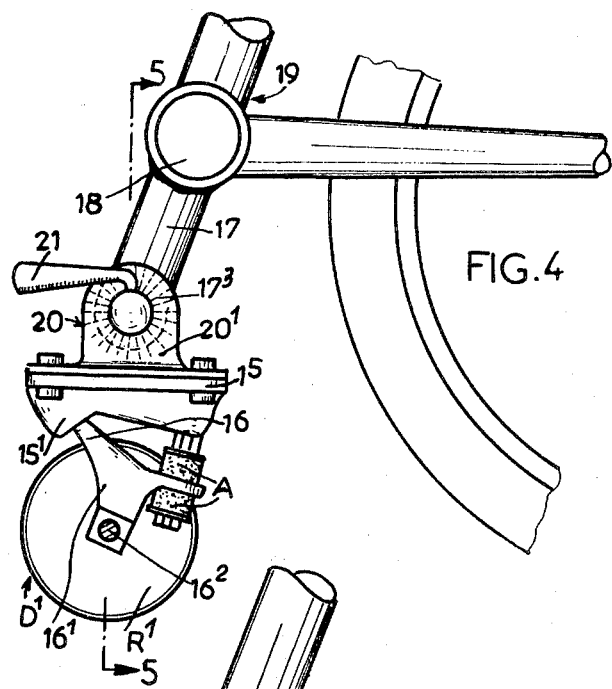
FIG. 4 is a partial front view of the self-orientation device in accordance with the alternative form of embodiment.

In order to make the object of the invention more concrete, the invention will be described now, not limitatively, with reference to the examples illustrated in the Figures of the drawings.

It may be seen from FIG. 1 that the vehicle in accordance with the invention is comprised chiefly of a framework denoted generally by (1), which accommodates a wheel (2) driven by a chain (3) by means of a sprocket wheel (4) with pedals (5), the unit being mounted in a known manner within a sprocket wheel housing (6).

In accordance with the non restrictive example shown in the Figures of the drawings, which is given as an indication only, the framework (1) embodies a saddle tube ($1^1$), while the tubes ($1^2$) and ($1^3$), which form the rear fork, extend from the sprocket wheel housing (6) and terminate by constituting a luggage-carrier fastened rearwardly of said saddle tube ($1^1$). The tube ($1^1$) receives a saddle (7) and forms beyond the sprocket wheel housing (6) a crate ($1^4$).

A device (D) with roller means (R) is mounted fixedly approximately adjacent to the sprocket wheel housing (6), and is arranged on the one hand for maintaining the balance of the vehicle, and on the other hand for providing the self-orientation of said vehicle by simple and appropriate transverse slanting motions of the body of the user.

The device (D) includes a support (8) suitably profiled to be secured by any well-known means, more particularly by welding, below the sprocket wheel housing (6) and to the free end of the resting crate ($1^4$) of saddle tube ($1^1$) (FIG. 3). For instance, in a manner which is absolutely not restrictive, the support (8) is made of one or more metal sheets which are sufficiently rigid and assembled to constitute two fastening lugs ($8^1$) and ($8^2$) of suitable size and slanted relative to a horizontal resting plate ($8^3$) which is reinforced and extended at ($8^4$).

The horizontal resting plate ($8^3$) receives fixedly any bearing means (S) of a well-known type and capable of taking various orientations in a horizontal plane under the gravitational action of the user slanting his body transversely in either direction to cause the vehicle to move, as the case may be, along a rectilinear or curved path. For instance, this bearing means for self-orientation is of the same type as the ones mounted on castor-wheel boards, which are more particularly known in the market under the tradename of "Skate-board".

The roller assembly includes a fastening shoe (9) mounted below the lower face of the horizontal resting plate ($8^3$) of the support (8). The shoe (9) forms a profiled and inclined axial web ($9^1$) for the angular engagement, at the lower end thereof, of a link (10) cooperating with a flat portion ($11^1$) of the axle (11) supporting at each end the roller means proper (12) mounted for free rotation.

The free end of the flat portion ($11^1$) of the axle (11) is connected to the shoe (9) by adjustable shock-absorbing means in the form of silent-blocks ($13$-$13^1$) for instance, which are working torsionally in order to permit in combination with the slanting link (10) the orientation of the axle (11) as a result of the slanting action of the user in either direction.

Mounting the device (D) adjacent to the sprocket wheel housing (6) is preferred, without however being restrictive. As a matter of fact, it is sufficient for the device to be mounted approximately at right angles with the vertical passing through the centre of gravity of the user seated on the saddle (7) to actuate the bearing system in a faultless and efficient manner for obtaining the orientation as desired.

It will be seen (in FIG. 1 for instance) that the device (D), more particurlarly the roller means (R) mounted at each end of the axle (11), provide also the balance in the inactive position of the vehicle, in combination with the wheel (2) of said vehicle, as the device constitutes a triangulation.

The length of the axle (11) may be varied by defining on the ground a triangulation with a larger or smaller base, and therefore with a balance which is more or less steady. Likewise, the roller means (R) consist of simple castors or wheels with a tire, of various possible diameters, although a diameter smaller than the diameter of the driving wheel (2) of the vehicle is preferred.

As far as the diameter of the roller means is concerned, the size of the support (8), and more particularly the height thereof, is determined by this diameter so that a horizontal plane approximately parallel to the ground (FIG. 3) will be defined at the base of the support after the mounting of the assembly of the device (D) below the framework (1) of the vehicle.

In accordance with the example in the Figures of the drawings, the frame-work (1) of the vehicle is so arranged that after the positioning of the user on the saddle (7), the driving wheel (2) will be situated rearwardly to the device (D) along the normal direction of movement of said vehicle.

It will be obvious that the reverse position of use is possible; for instance, it is sufficient to position and to shape differently more particularly the saddle tube ($1^1$) of the framework (1).

It is also contemplated to extend the framework (1) of the vehicle, for example beyond the resting crate ($1^4$), by a vertical or diagonal tube ($1^5$) (broken lines in FIG. 1), provided at the upper portion thereof with any profile (14) for instance, which serves as supporting means for the hands of the user.

According to a further form of embodiment, the axle (11) may be arranged to accommodate one wheel only. This wheel may be of sufficient width for maintaining the balance of the vehicle in the inactive position.

The use of the vehicle of the invention is particularly simple, while being original.

The user has merely to seat on the saddle (7) and to propel the vehicle in a known manner, by actuating the pedals; in the normal position, the vehicle follows a rectilinear path (FIG. 1), and when the user is acting by gravitation on the device (D) by crosswise slanting of his body in either direction, the vehicle follows a curved path the radius of curvature of which is in dependence on the degree of inclination of the user.

In accordance with an alternative form of embodiment illustrated in FIGS. 4, 5, 6 and 7, the self-orientation device denoted generally by (D1) is also provided with a self-orientable bearing system with a support (15) having an axial profiled and slanting web ($15^1$) for the angular engagement of a link (16) forming a support ($16^1$) for receiving or forming the axle ($16^2$) while permitting the mounting of the adjustable shock-absorbing means (A) connected to the support (15). Castors (R1) or othe bearing means are mounted for free rotation at the free ends of the axle ($16^2$).

According to this alternative form of embodiment, the device (D1) is arranged and provided with various means to be mounted angularly adjustable relative to the inclination of the vehicle.

For this purpose, the device includes a tube (17) which is secured by any well-known and convenient means, such as welding, to the sprocket wheel housing (18) of the framework (19). This tube (17) cooperates with an integral or inserted abutment shoe (20) arranged for various inclinations relative to said tube (17) and having moreover suitable means for interlocking in the angular position as desired. The abutment shoe (20) permits the mounting of the self-orientable bearing means, more particularly the support (15).

Figure 5:
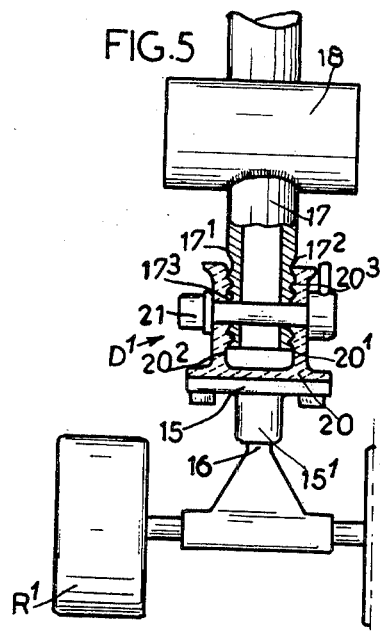
FIG. 5 is a transverse sectional view taken along the line 5—5 in FIG. 4.
Figure 6:
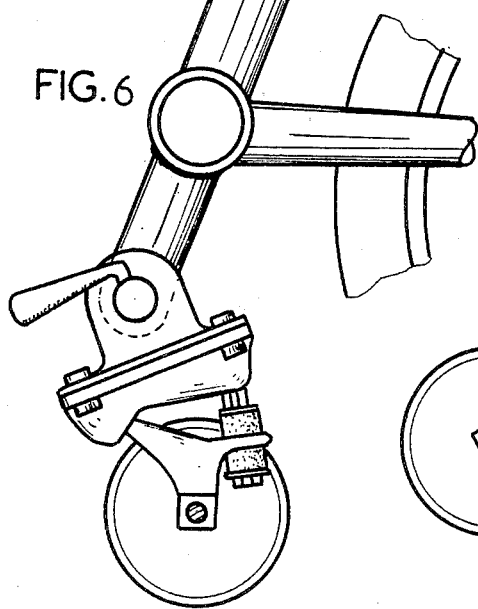
FIGS. 6 and 7 are views similar to FIG. 4 showing various inclinations of the self-orientation device in order to define a more or less important steering radius.
Figure 7:
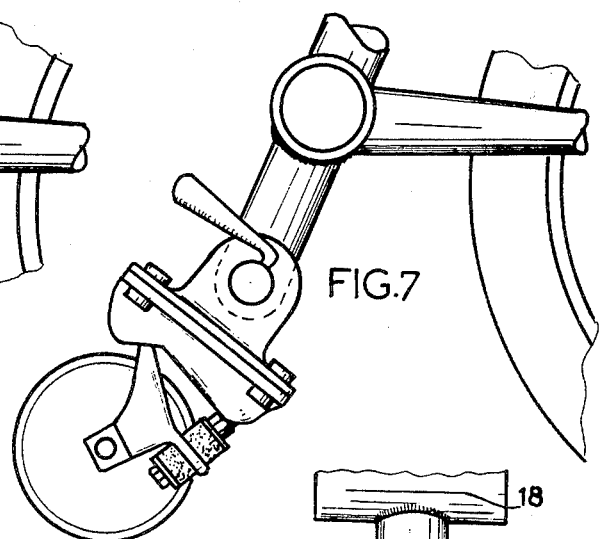

In a preferred, but non restrictive manner, the free end of the tube (17), opposite to the fastening point thereof relative to the framework (19), is machined to constitute two parallel plane faces ($17^1$) and ($17^2$) forming each one externally concentric serrations ($17^3$) or other rugged or grooved surfaces (FIG. 5). The serated end of the tube (17) is freely engaged between two shells ($20^1$) and ($20^2$) formed perpendicularly and laterally to the abutment shoe so as to constitute a yoke. The interfacing faces of the shells ($20^1$) and ($20^2$) are also serrated at ($20^3$), in a concentric manner, for a possible cooperation with the serrations ($17^3$) of the tube (17).

A clamping organ (21) is passed freely through the shells ($20^1$) and ($20^2$) and the tube (17) which are respectively for this purpose drilled transversely therethrough. The clamping organ (21) is arranged for moving axially, by elasticity, said shells toward one another relative to the serrated end ($17^3$) of the tube, in order to interlock angularly in position the shells ($20^1$–$20^2$) and the tube (17) by interengagement of the serrations or other grooved formations of the shells and of the tube. It is possible for example to use such clamping organs as the ones which are known as quick-acting clamping means (FIGS. 4 and 5).

The abutment shoe (20) with the serrated shells ($20^1$) and ($20^2$) is preferably made of plastics, and formed directly by molding.

Therefore, it will be clearly understood that in accordance with this form of embodiment, after having suitably mounted the self-orientable bearing means on the abutment shoe (20), it will be sufficient to engage the serrated end ($17^3$) of the tube (17) between the interfacing serrated faces ($20^3$) of the two shells ($20^1$) and ($20^2$), and to secure the mounting of the assembly by means of the clamping organ (21). When the latter is not completely interlocked, it is possible to cause the assembly of the device (D1) to be pivoted relative to the tube, as the various serrations ($20^3$) and ($17^3$) corresponding respectively to the shells ($20^1$–$20^2$) and to the tube (17) do not mesh together. On the other hand, when an interlocking action is applied to the clamping organ (21), the shells ($20^1$) and ($20^2$) are caused by the latter to move axially by elasticity toward one another, the serrations of said shells coming to mesh with the corresponding serrations ($17^3$) of the tube (17), performing thus the interlocking of the device in the angular position, while preventing a pivotal circular motion, more particularly of the shells ($20^1$) and ($20^2$) relative to the serrated end of the tube (17).

It is therefore possible to mount the assembly of the device (D1) providing the self-orientation of the vehicle according to various angular positions relative to the inclination of said vehicle and consequently to impart to the same a more or less important range of steering radius.

For instance, a large steering radius is obtained when the link (16) of the self-orientable system tends toward a horizontal position, (FIG. 6), i.e. when the device (D1), more particularly the bearing means (R1) tend to move toward the vertical passing through the centre of gravity of the user normally seated on the vehicle. Conversely, a small steering radius is obtained when the link (16) tends toward a vertical position (FIG. 7), i.e. when the device (D1) tends to move away from the vertical passing through the centre of gravity of the user normally seated on the vehicle.

Figure 8:
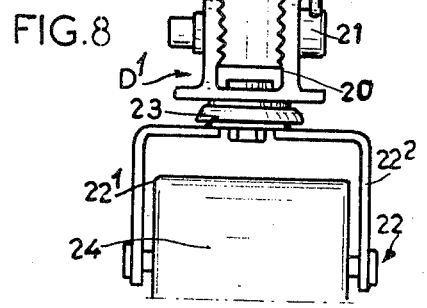
FIG. 8 is a transverse sectional view in part of a further form of embodiment of the self-orientation device.

In the form of embodiment of FIG. 8, the device (D1) is mounted as before, below the sprocket wheel housing, and is capable of taking various angular positions relative to the vehicle; the self-orientable bearing system only is different.

As a matter of fact, it may be seen that this system includes mainly a yoke-forming support clevis (22) mounted for free rotation relative to the abutment shoe (20) by means of any bearing organ (23) capable of giving to the unit a complete rotation of 360 degrees. The bearing means is in the form of a single castor (24) mounted between the vertical legs ($22^1$) and ($22^2$) of the yoke of the support clevis (22).

It will be well understood that while remaining within the scope of the invention, other equivalent means and arrangements may be provided for the adjustable lateral angular positioning of the self-orientation device relative to the inclination of vehicle. For example, the tube (17) may cooperate with an open and independent clamping collar forming rugged surfaces, serrations and the like and cooperating with complementary grooved forms provided in the shells ($20^1$) and ($20^2$) of the abutment shoe (20) receiving the bearing system.

I claim:

1. A velocipede comprising a frame, a seat mounted on said frame, a pedal bracket secured to said frame and rotatably mounting pedals about a pedal axis, chain and sprocket transmission means drivingly connecting said pedals to a single driving wheel, said single driving wheel being rotatable about a wheel axis disposed at the rear of said frame, a roller assembly mounted on said frame comprising relatively small diameter roller means rotatable about a roller axis, said roller axis being disposed lower than said pedal axis and said wheel axis, said pedal axis being disposed longitudinally between said roller axis and said wheel axis and adjacent said roller axis, means for articulating said roller assembly forwardly of said roller axis about an inclined articulation axis for enabling the rider to lean the velocipede laterally to either side of a longitudinal plane for controlling the direction of movement of the velocipede.

2. The velocipede of claim 1, wherein said means for articulating said roller assembly comprises a forwardly extending pivot fixed to the roller assembly cooperating with a complementary bearing member provided on a roller assembly mounting member secured to the lower front end of said frame.

3. The velocipede of claim 1, wherein said roller assembly mounting member is fixed on a horizontal plate rigidly fixed to said lower front end of said frame.

4. The velocipede of claim 1, wherein said roller assembly means is part of a skateboard truck.

5. The velocipede of claim 1, wherein a shock absorbing member is operatively disposed between said roller assembly and said roller assembly mounting member for absorbing shocks when said roller assembly pivots about said articulation axis and restoring said roller assembly to a centered position as the rider brings the velocipede back to a straight position.

6. The velocipede of claim 2, wherein means are provided for adjustably mounting the angular position of said mounting member on said frame about an axis generally parallel to said roller axis in the centered position of said roller assembly.

7. The velocipede of claim 6, wherein said means for adjustably mounting the angular position of said mounting member comprises cooperable serrated members in radial array respectively fixed relative to said frame and said mounting member and a clamping member for urging said serrated members in clamping relation in the desired position.

8. The velocipede of claim 1, wherein said articulation axis in inclined downwardly and rearwardly.

* * * * *